US007589800B2

(12) United States Patent
Lim et al.

(10) Patent No.: US 7,589,800 B2
(45) Date of Patent: Sep. 15, 2009

(54) METHOD OF DRIVING LIQUID CRYSTAL DISPLAY DEVICE

(75) Inventors: Joo-Soo Lim, Kyoungsangbuk-Do (KR); In-Byeong Kang, Kyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 560 days.

(21) Appl. No.: 11/248,181

(22) Filed: Oct. 13, 2005

(65) Prior Publication Data

US 2006/0028593 A1 Feb. 9, 2006

Related U.S. Application Data

(62) Division of application No. 10/267,656, filed on Oct. 10, 2002, now Pat. No. 6,982,770.

(30) Foreign Application Priority Data

Dec. 20, 2001 (KR) .......................... 2001-0081968

(51) Int. Cl.
  *G02F 1/136* (2006.01)
(52) U.S. Cl. ........................................... 349/43
(58) Field of Classification Search .................... 349/43
  See application file for complete search history.

(56) References Cited

U.S. PATENT DOCUMENTS 4,783,147 A * 11/1988 Maurice et al. ............... 349/43
5,656,824 A   8/1997 den Boer et al. ............. 257/59

FOREIGN PATENT DOCUMENTS

| JP | 05-082785 | 2/1993 |
| JP | 2000-196098 | 7/2000 |
| KR | 2001-0051914 | 6/2001 |

* cited by examiner

*Primary Examiner*—James A Dudek
(74) *Attorney, Agent, or Firm*—McKenna Long & Aldridge LLP

(57) ABSTRACT

A liquid crystal display device and a driving method for a liquid crystal display. The liquid crystal display device is formed to have thin film transistor conductive channels having an inverted "U"-shape. A shielding plate is provided to block incident light from reaching the conductive channels of the thin film transistors. This reduces or eliminates photo-induced leakage current and picture quality degradation. To prevent pixel electrode potential fluctuations caused by subsequent scan line drive signals, the liquid crystal display device is driven by scan signals that are sequentially applied from the mth gate line up to the first gate line.

4 Claims, 9 Drawing Sheets

US 7,589,800 B2

METHOD OF DRIVING LIQUID CRYSTAL DISPLAY DEVICE

This application is a divisional of application Ser. No. 10/267,656, filed Oct. 10, 2002 now U.S. Pat. No. 6,982,770 now allowed which claims priority to Korean Patent Application No. 2001-0081968, filed Dec. 20, 2001 each of which are incorporated by reference for all purposes as if fully set forth herein.

BACKGROUND OF THE INVENTION

1. Field of the Invention

This invention relates to liquid crystal displays. More particularly, this invention relates liquid crystal displays having reduced photo leakage current and improved picture quality.

2. Discussion of the Related Art

Cathode ray tubes (CRT) are widely used display devices in television sets, measurement instrumentation, and information terminals. However, because they are heavy and consume significant power, CRTs are not well suited to applications that require compact, lightweight, low power displays.

A substitute for CRTs, liquid crystal displays, is compact, lightweight, and consumes low power. A liquid crystal display device incorporates a matrix of liquid crystal cells that are sequentially selected, line-by-line, to produce picture information. To do so, liquid crystal cells vary their light transmittance in accord with data signals that carry picture information.

A liquid crystal display includes a liquid crystal panel having liquid crystal cells and driver integrated circuits (IC) for driving those liquid crystal cells. A liquid crystal panel is usually comprised of a thin film transistor array substrate and of a color filter substrate that are disposed in a facing relationship. Additionally, a liquid crystal layer is interposed between the thin film transistor array substrate and the color filter substrate.

A thin film transistor array substrate includes a plurality of data lines for transmitting data signals from data driver integrated circuits to the liquid crystal cells, and a plurality of gate lines for transmitting scan signals supplied from gate driver integrated circuits to the liquid crystal cells. The liquid crystal cells are defined by intersections of the data lines and the gate lines. As a gate driver integrated circuit sequentially supplies scan signals to the gate lines, data signals are supplied to the liquid crystal cells.

A common electrode on the color filter substrate and pixel electrodes on the thin film transistor array substrate are used to produce electric fields across the liquid crystal layer. By controlling the voltage applied to the pixel electrodes the light transmittance of each liquid crystal cell can be controlled.

To control the voltage applied to a pixel electrode, a thin film transistor is formed in each liquid crystal cell. When a scan signal is supplied to a gate electrode of the thin film transistor, a conductive channel is formed between a source electrode, which is connected to a data line, and a drain electrode, which is connected to an associated pixel electrode. Thus, the thin film transistor controls the flow of data signals to the pixel electrodes. Thin film transistors usually use amorphous silicon, which can be formed at a low temperature on a large-scale insulation substrate, such as a low-priced glass substrate, as an active layer. Accordingly, controlling data signals applied to each liquid crystal cell by selective switching of the thin film transistors, the light transmittance of the liquid crystal cells can be controlled.

The light transmitting process of a liquid crystal display device will now be described. First, a common electrode voltage is supplied to the common electrode. Then, scan signals are sequentially supplied to the gate lines by gate driver integrated circuits. The scan signals are applied to the gate electrodes of the thin film transistors. Meanwhile, data signals are supplied to the liquid crystal cells by data driver integrated circuits via data lines. The data signals are applied to the source electrodes of the thin film transistor.

Accordingly, the data signals are supplied to the drain electrodes through conductive channels formed when a scan signal is applied to a particular transistor. The data signal is supplied to the drain electrode through the channel. The data signal is thus supplied to the pixel electrode that is connected to the drain electrode. In practice, the pixel electrode is also connected to a storage electrode. Thus, the data signal voltage supplied to each pixel electrode is stored in a storage electrode. When a thin film transistor is turned off, the voltage across its storage capacitor continues to be applied to the pixel electrode, thereby maintaining the liquid crystal cell drive.

As mentioned, since a common electrode voltage is applied to the common electrode, and a data signal voltage is applied to the pixel electrode, electric fields are produced across the liquid crystal layer by the potentials of the common electrode and of the pixel electrodes.

When an electric field is applied across the liquid crystal layer, the liquid crystal is rotated by dielectric anisotropy to selectively transmit light emitted from a back light unit through the pixel electrode. The electric field strength is controlled by the data signal voltage that is applied to the pixel electrode, and the light transmittance of the liquid crystal layer is controlled by the electric field strength.

Unfortunately, continuous applying a single electric field polarity degrades the liquid crystal. To prevent such degradation the data signals alternately switch polarity relative to the common voltage. This general technique is called inversion driving.

FIG. 1 is an exemplary view showing voltage waveforms applied to a liquid crystal display device. As shown, a common electrode voltage (Vcom) is applied to the common electrode, while a data signal voltage ($V_{DATA}$) is applied to the source electrode of a thin film transistor via the data line. Additionally, a scan signal ($V_G$) is applied to the gate electrode of the thin film transistor via the gate line.

During the turn-on period of the thin film transistor, when the scan signal ($V_G$) is applied at a high potential, the positive data signal voltage ($V_{DATA}$) is supplied to the pixel electrode and to the source capacitor by the drain electrode. At that time, the positive data signal voltage ($V_{DATA}$) is charged into the storage capacitance. Thus, as shown, a pixel electrode voltage ($V_P$) is produced.

When the thin film transistor is turned off by removal of the scan signal ($V_G$), a voltage drop from the charged pixel electrode voltage ($V_P$) occurs because of a parasitic capacitance. The voltage drop is called a kick-back voltage ("$\Delta V_P$"), reference FIG. 1.

During the turn-off period the pixel electrode voltage ($V_P$) charged into the storage capacitor is applied to the pixel electrode, thus maintaining drive to the liquid crystal cell.

Meanwhile, in the n+1th frame, since the above-described inversion driving method is used, a negative data signal voltage ($V_{DATA}$) is supplied through the source and drain electrodes to the pixel electrode and to the storage capacitor. Accordingly, as shown in FIG. 1, the pixel electrode voltage ($V_P$) in the n+1th frame has a voltage waveform that is symmetrical relative to the common electrode voltage (Vcom) with the pixel electrode voltage ($V_P$) of the nth frame, Meanwhile, since the thin film transistor channel is amorphous silicon, if an external light is irradiated onto the channel a photo-induced leakage current results. The photo-induced leakage current decreases the voltage of the storage capacitor during the turn-off period, which reduces the pixel electrode voltage ($V_P$) as shown in FIG. 1.

Since a transmission type liquid crystal display device does not emit light, it requires an optical source such as a back light unit or external light. A liquid crystal display device that uses a back light unit is called a transmission type liquid crystal display device, while a liquid crystal display device that uses external natural light is called a reflective type liquid crystal display device.

The transmission type liquid crystal display device usually locates the back light unit either below the liquid crystal display panel or along an edge. Currently, the edge-type transmission type is more common.

However, the transmission type liquid crystal display device is inefficient in that only 3% to 8% of the light from the back light unit is actually transmitted. For example, using the reasonable assumptions that the transmittance of two polarization plates is about 45%, that the transmittance of two glass substrates is about 94%, that the transmittance of a thin film transistor array and pixel is about 65%, and that the transmittance of a color filter is about 27%, then the overall transmittance of a liquid crystal display device is about 7.4%.

Thus, the amount of light from a transmission type liquid crystal display device is only about 7% of the light from the back light unit. Thus, if a high luminance is required the back light unit needs to be very bright, something that causes great power consumption. Thus, in order to supply enough power to the back light unit a large, heavy, high capacity battery is required. Even with such a battery there is a limit on how long the liquid crystal display device can be used while traveling. Further, such a large capacity battery is an obstacle to achieving the desired size, weight, and portability.

A solution to the power problems of the transmission type liquid crystal display device is the reflective type liquid crystal display device. The reflective type liquid crystal display produces an image using external light. Thus, only a small amount of power is required. Accordingly, a reflective type liquid crystal display device can be used for extended periods of time, is more compact, lightweight and portable. Furthermore, since the entire unit pixel can be used, the aperture ratio of a reflective type liquid crystal display device is excellent.

The reflective type liquid crystal display device includes a translucent reflective electrode that is made of a light reflective metal, instead of the transparent conductive material used in a transmission type liquid crystal display device. The reflective electrode produces an electric field across the liquid crystal layer in conjunction with a common transparent electrode on the color filter substrate.

When an electric field is applied across the liquid crystal layer, the liquid crystal is rotated by the dielectric anisotropy. This controls the amount of external light that is transmitted through the color filter substrate, and thus the amount of light reflected by the reflective electrode. The reflected light is thus controlled by voltages applied to the reflective electrodes.

However, the reflective type liquid crystal display device has a problem in that since the materials of the reflective electrode and the common transparent electrode are different, the driving characteristics of the liquid crystal are deteriorated, which results in degradation of the image produced on the liquid crystal display device.

In addition, the external light required for the reflective type liquid crystal display device is not constant. That is, while a reflective liquid crystal display device can be used during the day or when artificial light exists, it will not work in the dark.

Consequently, transmission/reflective type liquid crystal display devices have been proposed. The transmission/reflective type liquid crystal display device adopts a reflection mode when external light is available, but a transmission mode when external light is not available.

The transmission/reflective type liquid crystal display device will be described with reference to the accompanying drawings. FIG. 2 shows a plan view of a unit pixel of a transmission/reflective type liquid crystal display device. With reference to FIG. 2, gate lines 104 are arranged at regular intervals on a substrate, and data lines 102 are arranged at regular intervals, but in a crossing relationship. Accordingly, the gate lines 104 and the data lines 102 form a matrix of liquid crystal cells. A thin film transistor (TFT), a reflective electrode 114 and a pixel electrode 115 are provided in each liquid crystal cell.

Each thin film transistor includes a gate electrode 110 that extends from a gate line 104, and a source electrode 108 that extends from a data line 102 and that overlaps the gate electrode 110. Additionally, each thin film transistor includes a drain electrode 112 that corresponds to the source electrode 108 on the gate electrode 110. Each thin film transistor (TFT) also includes an active layer (not shown in FIG. 2) for forming a conductive channel between the source electrode 108 and the drain electrode 112 when a scan signal is supplied to the gate electrode 110. As the active layer, amorphous silicon is beneficial in that it can be formed at a low temperature on a low-priced glass substrate.

Extending the conductive channel tends to improve the characteristics of the thin film transistor (TFT). Thus, the conductive channel is preferably formed in an "L" shape or in a "U" shape. FIG. 2 illustrates the "U" shape. To achieve a "U"-shaped conductive channel, the source electrode 108 extends with a hook shape from the data line 102, and the drain electrode 112 is inside the hook.

Compared to an "L"-shaped conductive channel, the "U"-shaped conductive channel is longer. Furthermore, the overlap between the drain electrode 112 and the gate electrode 110 can be formed despite some misalignment in the fabrication process. However, the overlap between the drain electrode 112 and the gate electrode 110 is significantly influenced by misalignment. Thus, the parasitic capacitance (Cgd) between the drain electrode 112 and the gate electrode 110 can be changed enough that picture quality degradation results.

The pixel electrode 115 and the drain electrode 112 electrically connect through a drain contact hole 116 that is formed through an insulation film (not shown in FIG. 2). The pixel electrode 115 is formed in the pixel region of each liquid crystal cell and is comprised of a transparent conductive material.

At marginal portions of the each pixel region is a translucent reflective electrode 114 that is comprised of a highly reflective and conductive material. The reflective electrode 114 is overlapped by the insulation film and by the pixel electrode 115. The reflective electrode 114 is also formed near the thin film transistor (TFT). Thus, the reflective electrode acts as a shielding plate 114A that blocks light that is directed toward the conductive channel of the thin film transistor (TFT). Because of the shielding plate 114A, light irradiated toward the conductive channel is blocked, and thus photo-induced current leakage of the thin film transistor (TFT) is reduced or prevented.

Referring once again to FIG. 1, by minimizing the reduction of the pixel electrode voltage ($V_P$) charged into the storage capacitor during the turn-off period of the thin film transistor (TFT), the picture quality of the liquid crystal display device could be improved.

In conventional transmission/reflective type liquid crystal displays of the type used in notebook personal computers, if the external illumination is below about 50,000 to 60,000 (Lux), that light is blocked by the shielding plate 114A. Referring now to FIG. 3, but if the external illumination is around 100,000~110,000 (Lux), something like noon sun light, incident light having an incident angle of less than 30° relative to the display unit of the notebook type personal computer is not blocked. Problems can arise because the shielding plate 114A does not sufficiently block the light.

Referring once again to FIG. 2, if the shielding plate 114A fails to sufficiently block the light incident at regions "A" to "D" photo-induced leakage currents and their consequent picture quality degradation can result.

FIG. 4 is a sectional view of the thin film transistor taken along line I-I' of FIG. 2. As shown, the sectional structure includes the gate electrode 110 on a substrate 101, and a gate insulation film 130 over the substrate 101 and over the gate electrode 110. Beneficially, the gate electrode 110 is formed along with the gate line 104.

Still referring to FIG. 4, an active layer 136 is on the gate insulation film 130 and over the gate electrode 110. The active layer 136 includes an amorphous silicon semiconductor layer 132 and an n+ amorphous silicon ohmic contact layer 134 that is highly doped with phosphor. The drain electrode 112 is located above the center of the active layer 136, while the source electrode 108, which is also above the active layer 136, is located away from the drain electrode 112 toward the edges of the active layer 136.

The ohmic contact layer 134 is partially removed during patterning of the source electrode 108 and the drain electrode 112 to assist defining the "U" shaped channel.

Still referring to FIG. 4, a passivation film 138 is formed over the source electrode 108 and the drain electrode 112, over the active layer 136, and over the gate insulation film 130. The passivation film 138 can be an inorganic insulation film, such as SiNx or SiOx, or to improve the aperture ratio, the passivation film 138 can be an organic insulation film such as benzocyclobutane (BSB), spin-on-glass (SOG) or acryl having a low dielectric constant. If the reflective electrode 114 (described in more detail subsequently) is directly deposited on an organic insulation film, to prevent contamination of the deposition chamber by organic materials, the passivation film 138 can be formed by stacking organic and insulation films.

Still referring to FIG. 4, the reflective electrode 114 and the shielding plate 114A are on the passivation film 138. Those structures can be simultaneously patterned. Then, an inorganic insulation film 140, such as SiNx or SiOx, is formed over the passivation film 138 and over the reflective electrode 114. The inorganic insulation film 140 electrically insulates the reflective electrode 114 and a pixel electrode 124 (described below) such that when an electric field is applied between the common electrode (not shown) on the transparent color filter substrate and the translucent reflective electrode 114, deterioration of the liquid crystal due to different materials is prevented.

Still referring to FIG. 4, a drain contact hole 116 is then formed through the passivation film 138 and through the inorganic insulation film 140 so as to expose a portion of the drain electrode 112. Then, the pixel electrode 124 is formed over the inorganic insulation film 140 and into the drain contact hole 116 so as to contact the drain electrode 112.

Referring now back to FIG. 2, the gate lines 104 extend perpendicular to the gate electrodes 110. The gate lines 104 act as a first electrode of a storage capacitor. An insulation film overlaps the first electrode, and then a storage electrode (not shown) overlaps the first electrode with the insulation film acting as a dielectric layer, thus forming a storage capacitor 118. The storage electrode 118 connects to a pixel electrode 115 through a storage contact hole 122.

FIG. 5 is a cross-sectional view of the storage capacitor 118 taken along line II-II' of FIG. 2. As shown, the storage electrode includes the first electrode 119 on the substrate 101. The gate insulation film 130 covers the substrate 101 and the first electrode 119. The storage electrode 120 is formed on the gate insulation film 130 and over part (reference FIG. 2) of the first electrode 119.

Still referring to FIG. 5, the passivation film 138 and the inorganic insulation film 140 are stacked over the gate insulation film 130 and over the storage electrode 120. The reflective electrode 114 is formed as previously described. A storage contact hole 122 is formed through the inorganic insulation film 140 and through the passivation film 138 to expose a portion of the storage electrode 120. A pixel electrode 124 is then formed over the inorganic insulation film 140, into the storage contact hole 122, and in electrical contact with the storage electrode 120.

Accordingly, the storage electrode 120 overlaps the first electrode 119 with an interposed gate insulation film 130, thereby forming the storage capacitor 118.

The storage capacitor 118 is charged to a data signal voltage during the turn-on period of the thin film transistor (TFT) (when a scan signal is applied to the gate line 104). The charged voltage is then applied to the pixel electrode 124 during the turn-off period of the thin film transistor (TFT), thereby maintaining the state of the liquid crystal in the OFF period.

As mentioned, a conventional liquid crystal display device in a notebook type personal computer can have a degraded picture when light is incident at an angle of less than 30°. This is because the thin film transistor conductive channel receives such incident light, which creates photo-induced leakage current, which causes picture quality degradation.

Therefore, a new liquid crystal display that does not suffer from photo-induced leakage current when light is incident at an angle of less than 30° would be beneficial.

SUMMARY OF THE INVENTION

Accordingly, the present invention is directed to a liquid crystal display device and driving method thereof that substantially obviates one or more of the problems due to limitations and disadvantages of the related art.

An advantage of the present invention is to provide a liquid crystal display device and its driving method that improves picture quality by minimizing photo-induced leakage current.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a liquid crystal display device having a plurality of gate lines and a plurality of data lines that cross the gate lines. Gate electrodes extend from the gate lines, and source electrodes of thin film transistors having active layers extend from the data lines and overlap the gate electrodes. Furthermore, drain electrodes of the thin film transistors define conductive channels. The drain electrodes are formed in an inverted "U" shape such the source electrodes form shielding plates for blocking incident light that is directed toward the conductive channel of the thin film transistor.

Another advantage of the present invention is to provide a driving method for driving M gate lines $G_1$ though $G_M$. The method including applying a gate signal voltage pulse to a p+1th gate line so as to form a plurality of inverted "U" shaped channels. Then, sequentially applying a gate signal voltage pulse to the pth gate line so as to form a plurality of inverted "U" shaped channels, and sequentially applying a gate signal voltage pulse to the p−1th gate line so as to form a plurality of inverted "U" shaped channels, wherein p+1 is less than or equal to M, and wherein p−1 is greater than or equal to 1.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

Figure 6:
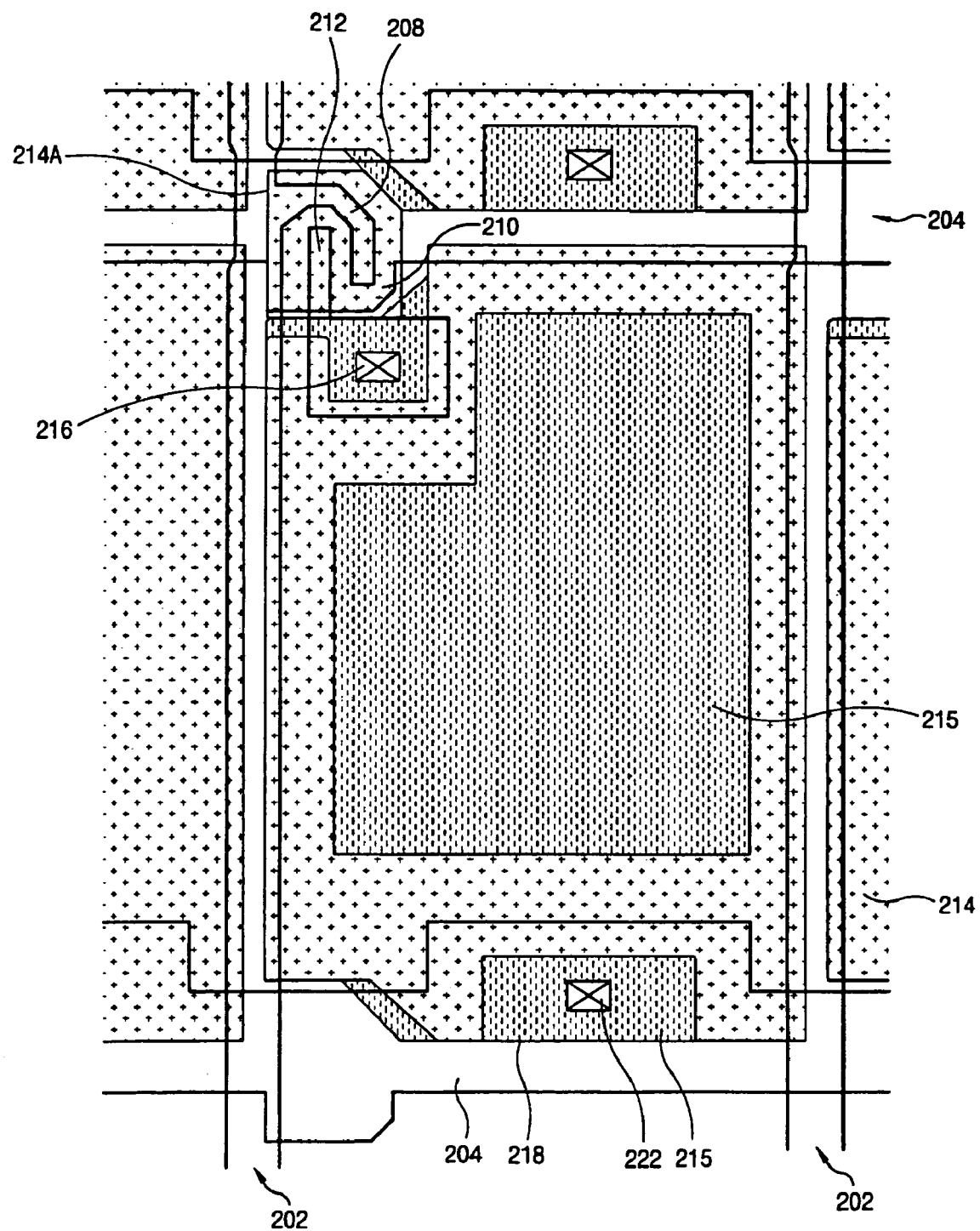
FIG. 6 illustrates a transmission/reflective type liquid crystal display device that is in accord with the principles of the present invention.

FIG. 6 is an exemplary view of a transmission/reflective type liquid crystal display device that is in accordance with a preferred embodiment of the present invention. With reference to FIG. 6, gate lines 204 are arranged at regular intervals on a substrate, and data lines 202 are arranged at regular intervals so as to cross the gate lines 204. The gate and data lines are isolated from each other. Accordingly, the gate lines 204 and the data lines 202 form a matrix of unit liquid crystal cell that are defined by the data lines 202 and the gate lines 204. Each liquid crystal cell includes a thin film transistor (TFT), a reflection electrode 214, and a pixel electrode 215.

Each thin film transistor (TFT) includes a gate electrode 210 that extends in a predetermined direction (see below) from the gate line 204, a source electrode 208 that extends from the data line 202 (as is subsequently explained) so as to overlap part of the gate electrode 210, and a drain electrode 212 that is formed on the gate electrode 210 so as to correspond with the source electrode 208. The thin film transistor (TFT) also includes an active layer (which is not shown in FIG. 6 for clarity) wherein a conductive channel is formed between the source electrode 208 and the drain electrode 212 when a scan signal is applied to the gate electrode 210 via the gate line 204. The active layer is beneficially comprised of amorphous silicon, which can be formed at a relatively low temperature on a low-priced glass substrate.

Figure 1:
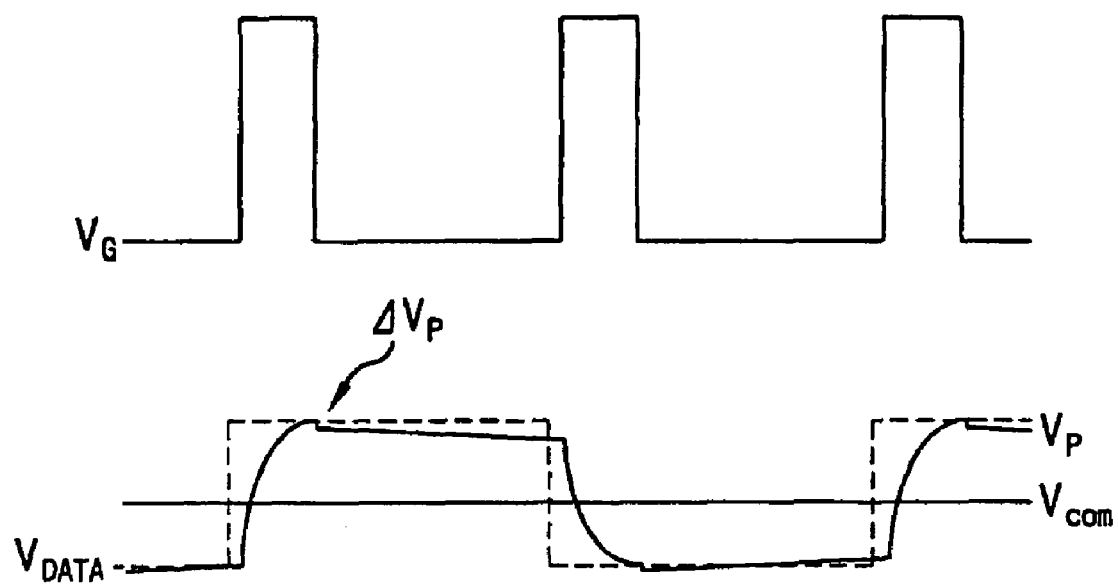
FIG. 1 is an exemplary view showing voltage waveforms applied to a conventional art liquid crystal display device.
Figure 2:
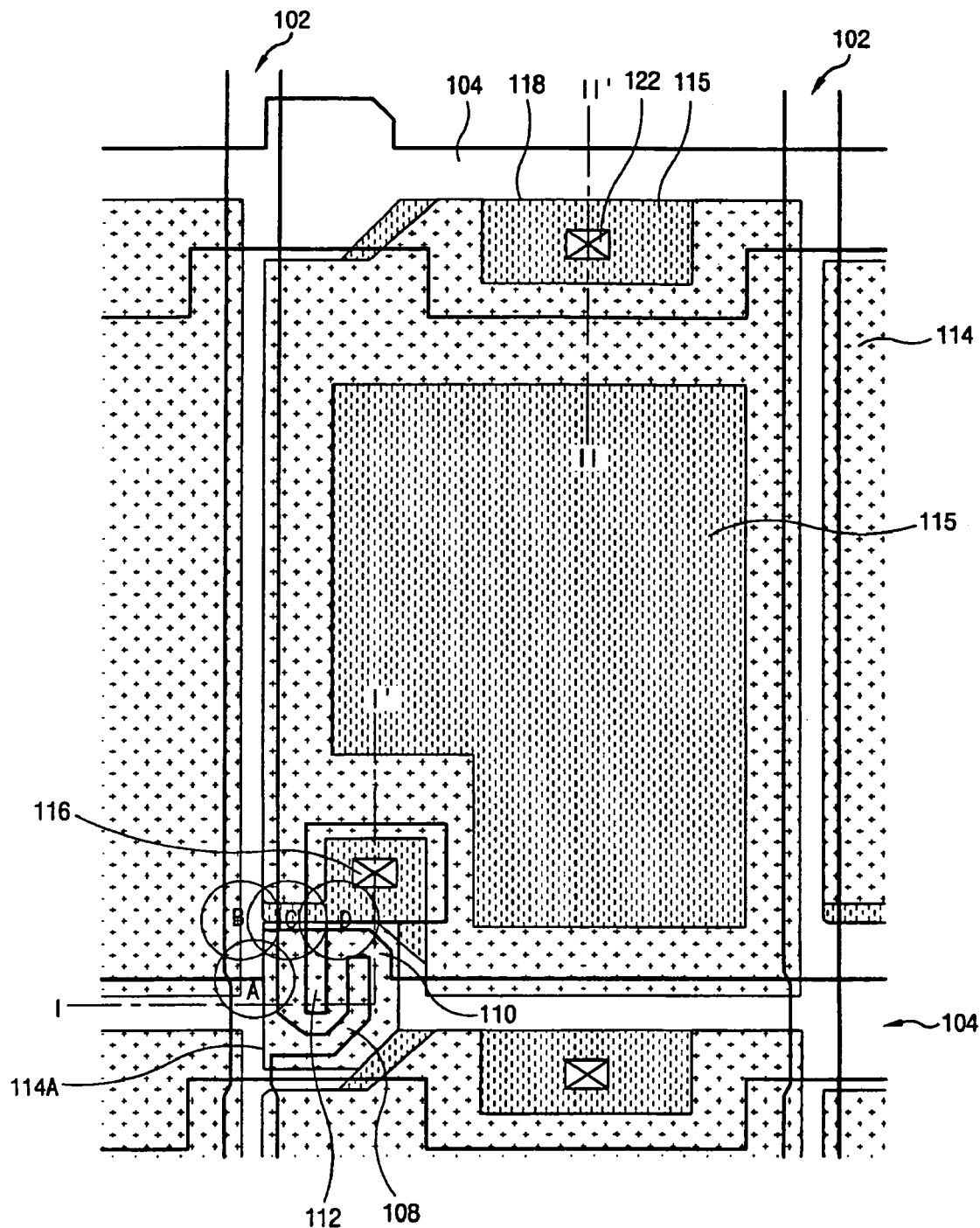
FIG. 2 illustrates a unit pixel of a conventional art general transmission/reflective type liquid crystal display device.

As shown in FIG. 6, the source electrode 208 extends from the data line 202 in an inverted hook shape, which is in contrast to the upright hook shape of the source electrode in FIG. 2. The drain electrode 212 is isolated by a predetermined interval from the inside of the source electrode 208, but extends into the hook portion. Accordingly, the conductive channel formed in the active layer has an inverted "U" shape. Additionally, the gate electrode 210 extends downward toward the bottom of the display.

Still referring to FIG. 6, a pixel electrode 215 electrically contacts the drain electrode 212 through a drain contact hole 216 that is formed in an insulation film (not shown in FIG. 6) over the drain electrode 212. The pixel electrode 215 is made of a transparent conductive material and is formed in the pixel region defined by the liquid crystal cell. Furthermore, at marginal portions of the pixel region 215 and on the insulation film (again, which is not shown in FIG. 6) is a translucent reflection electrode 214 that is comprised of a reflective and conductive material. The reflection electrode 214 is also formed over an upper portion of the thin film transistor (TFT). That part of the reflection electrode serves as a shielding plate 214A that blocks light that is directed toward the conductive channel from reaching the thin film transistor (TFT).

Still referring to FIG. 6, the gate line 204 extends in the direction opposite the gate electrode 210. Part of the gate line 204 acts as a first electrode of a storage capacitor 218. That storage capacitor further includes part of the insulation film, which acts as a dielectric, and a storage electrode that overlaps the first electrode. The storage electrode (which is below the pixel electrode) is connected to the pixel electrode 215 through the storage contact hole 222.

Figure 3:
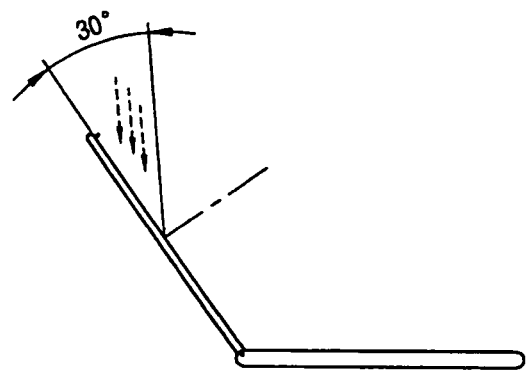
FIG. 3 is an exemplary view showing the incident angle of light.
Figure 4:
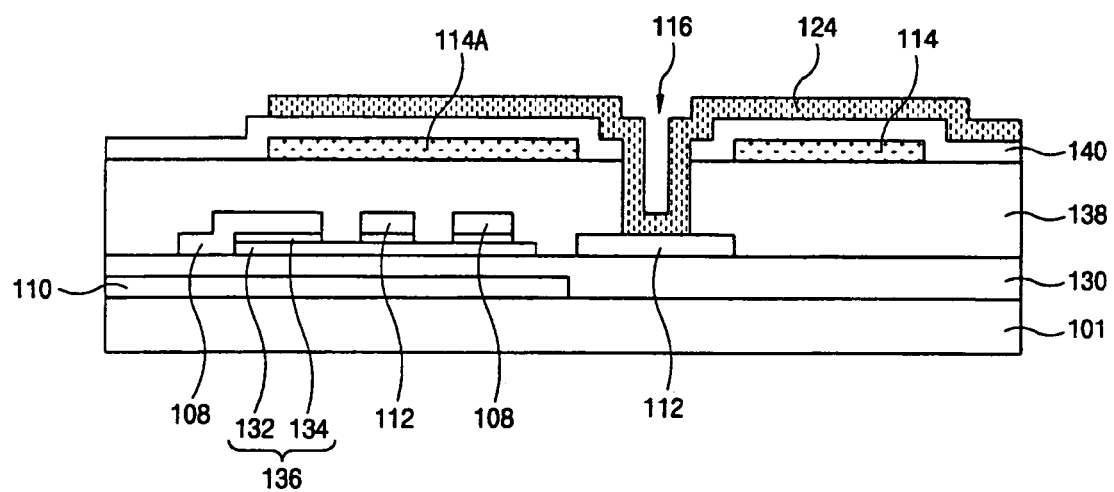
FIG. 4 is a sectional view taken along line I-I' of FIG. 2.
Figure 5:
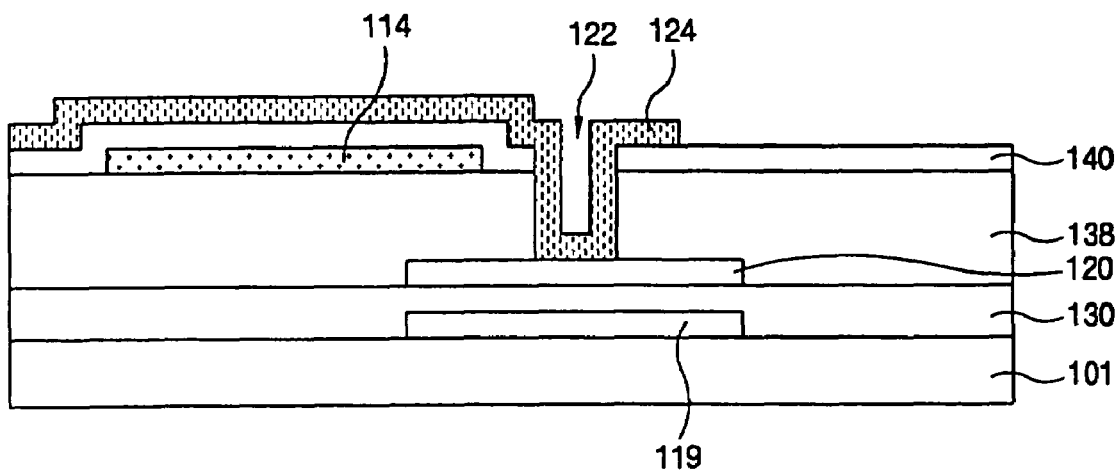
FIG. 5 is a sectional view taken along line II-II" of FIG. 2.

Thus, a transmission/reflective type liquid crystal display device in accord with FIG. 6 includes both a thin film transistor (TFT) that forms an inverted "U" conductive channel, and a shielding plate 214A that protects that conductive channel. Accordingly, light that is incident at an angle of less than 30° (reference FIG. 3) to a display unit of a notebook type personal computer that is in accord with the principles of the present invention is blocked by the source electrode 208 that helps form the inverted "U"-shaped conductive channel. Thus, light that would be incident on the regions "A" to "D" of FIG. 2 is blocked. Such blocking reduces or prevents photo-induced leakage current in the thin film transistor (TFT).

The transmission/reflective type liquid crystal display device of the conventional art as shown in FIG. 2 and the transmission/reflective type liquid crystal display device in accordance with the present invention as shown in FIG. 6 will now be compared. First, referring to the conventional liquid crystal display device shown in FIG. 2, the liquid crystal cells defined by intersections of the data lines 102 and the gate lines 104 include a thin film transistor (TFT) and the storage capacitor 118. The thin film transistors (TFT) of the pth gate line 104 include gate electrodes 110 that extend in the direction of the p−1th gate line 104. The drain electrode 112 and the source electrode 108 that overlap the gate electrode 110 form a "U"-shaped conductive channel.

Additionally, the storage capacitors 118 for the drains of the pth gate line 104 include a first electrode 119 formed by the p−1th gate line 104 and a storage electrode 120 that overlaps the first electrode 119. Additionally, the storage electrode 120 connects to the pixel electrode 115 through a storage contact hole 122 over the p−1th gate line.

In contrast, a transmission/reflective type liquid crystal display device in accord with FIG. 6 has unit liquid crystal cells defined by intersections of data lines 202 and gate lines 204. Those unit liquid crystal cells include thin film transistors (TFT) and storage capacitors 218. Each of those thin film transistors (TFT) includes a gate electrode 210 that extends from the pth gate line 204 toward the p+1th gate line 204. Additionally, each thin film transistor (TFT) includes a drain electrode 212 and a source electrode 208 that overlap the gate electrode 210 so as to form an inverted "U" shaped conductive channel.

Additionally, the storage capacitors 218 for the thin film transistors on the pth gate line 204 each include a first electrode that is part of the p+1th gate line 204, part of the gate insulation film, and a storage electrode that is connected to the pixel electrode 215 through a storage contact hole 222 over the p+1th gate line 204. The storage capacitor 218 is charged to a data signal voltage during a turn-on period of the thin film transistor (TFT) when a scan signal is applied to the pth gate line 204. The storage capacitor 218 then supplies the charged voltage to the pixel electrode 224 during the turn-off period of the thin film transistor (TFT) to maintain the drive of the liquid crystal.

Figure 7:
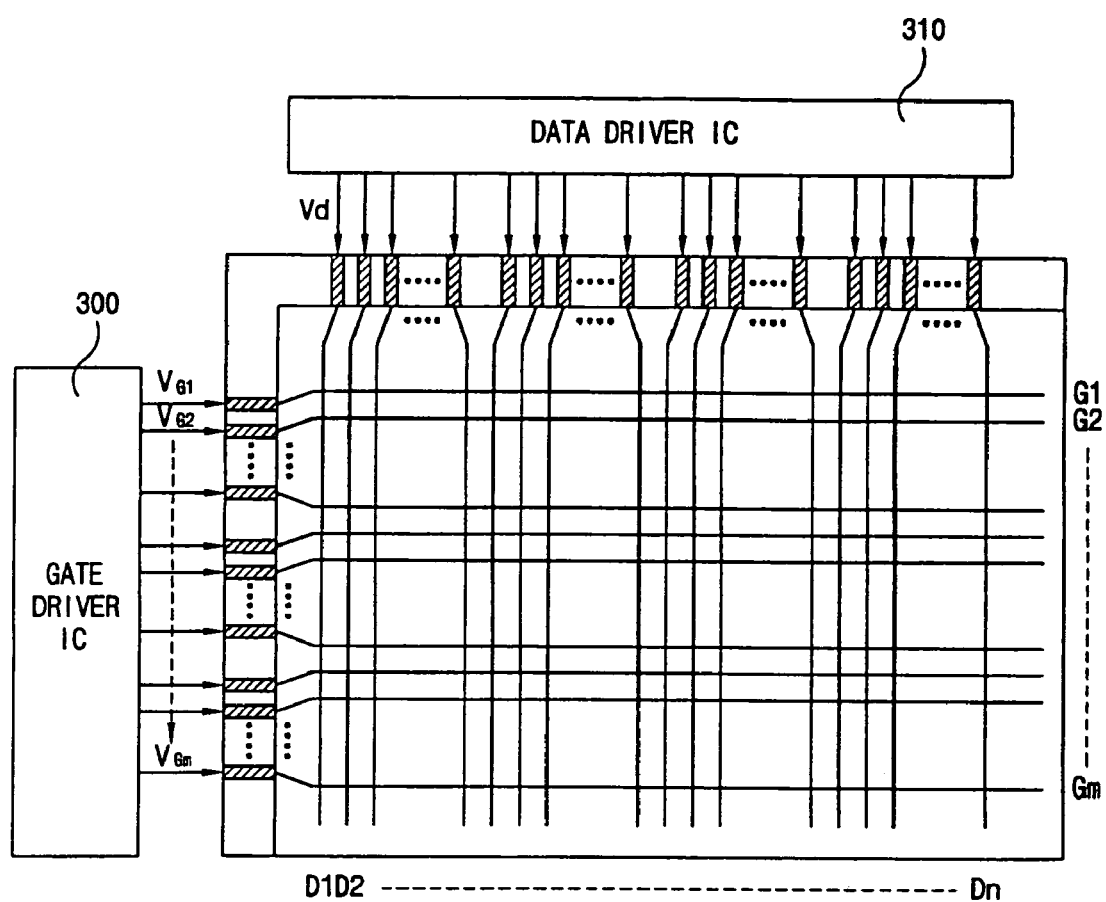
FIG. 7 is an exemplary view showing a conventional method of applying scan signals.
Figure 8:
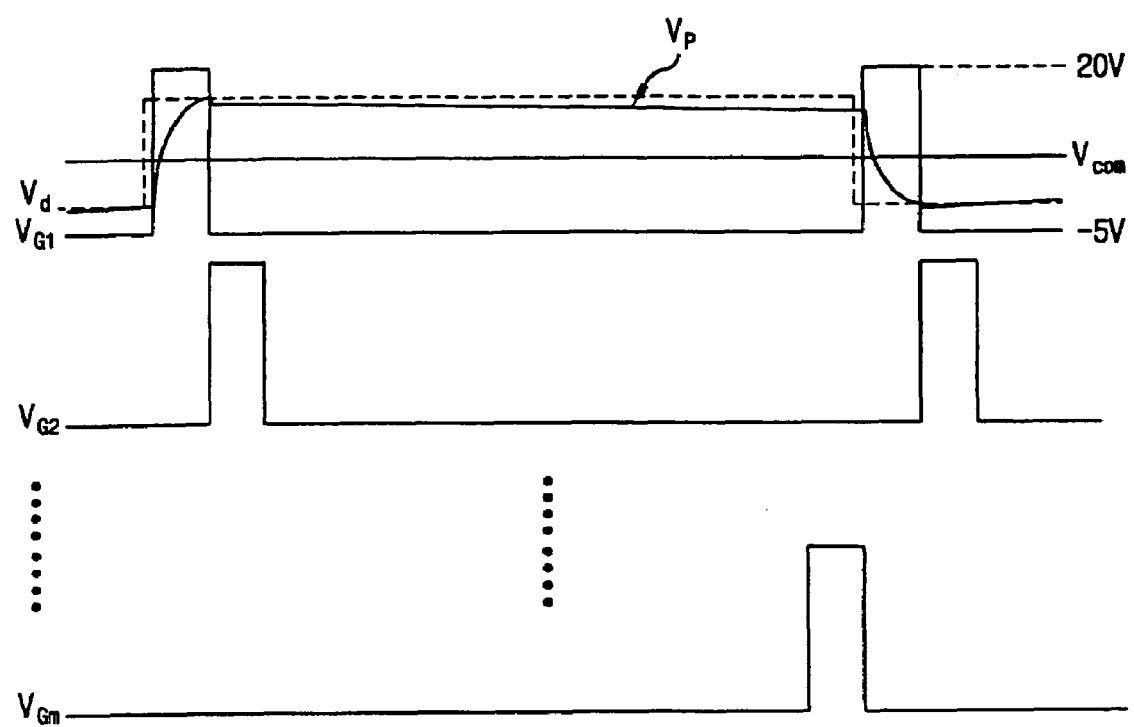
FIG. 8 illustrates applied voltage waveforms of FIG. 7.

A general driving method of a conventional liquid crystal display device will now be described in detail with reference to FIGS. 7 and 8. First, a common electrode voltage (Vcom) is applied to the common electrode. Then scan signals ($V_{G1}$ to $V_{Gm}$) are sequentially supplied to the first gate lines ($G_1$) through the mth gate line ($G_m$) by a gate driver integrated circuit 300. The scan signals ($V_{G1}$ to $V_{Gm}$) are applied as pulses having a low potential of −5V and a high potential of 20V. Accordingly, when a scan signal ($V_{G1}$) is applied to the first gate line ($G_1$), the 20V high potential applied to the gate electrodes connected to the first gate line ($G_1$) turn on their associated thin film transistors. Accordingly, conductive channels are formed. Then, the data signal voltages ($V_d$) supplied by the data driver integrated circuit 310 to the data lines ($D_1$ to $D_n$) are applied to the source electrodes of the thin film transistors connected to the first gate line ($G_1$). The data signal voltages ($V_d$) pass through the thin film transistor channels to the drain electrodes. Since the drain electrodes connect to the pixel electrodes through the drain contact holes, the data signal voltages ($V_d$) are applied to the pixel electrodes. This forms electric fields to the common electrode. Thus, the liquid crystal is driven to control its light transmittance. Furthermore, since the pixel electrodes are connected to the storage electrodes through the storage contact holes, the data signal voltages ($V_d$) applied to the pixel electrodes are charged into the storage capacitors during turn-on. When the scan signal ($V_{G1}$) applied to the first gate line ($G_1$) returns to −5V, a 20V scan signal ($V_{G2}$) is applied to the second gate line ($G_2$). Then, the thin film transistors connected to the first gate line ($G_1$) turn off, while those connected to the second gate line turn on. The data signal voltages ($V_d$) charged into the storage capacitors associated with the first gate line ($G_1$) continue to be supplied to the pixel electrodes. This maintains the drive to the liquid crystal cells of the first gate line ($G_1$). As the thin film transistors associated with the second gate line ($G_2$) turn on, the foregoing process is repeated for the liquid crystal cells associated with the second gate line.

However, with a transmission/reflective type liquid crystal display device in accord with FIG. 6, since the storage capacitors associated with the first gate line ($G_1$) include part of the second gate line ($G_2$), the data signal voltages ($V_d$) charged into the storage capacitors associated with the first gate line ($G_1$) would fluctuate if they were driven as in the conventional art. This is because the data signal voltages ($V_d$) charged into the storage capacitors associated with the first gate line ($G_1$) would be impacted by the scan signal voltage ($V_{G2}$) applied to the second gate line ($G_2$). Such fluctuations would degrade picture quality due to flicker or an image stain.

Figure 9:
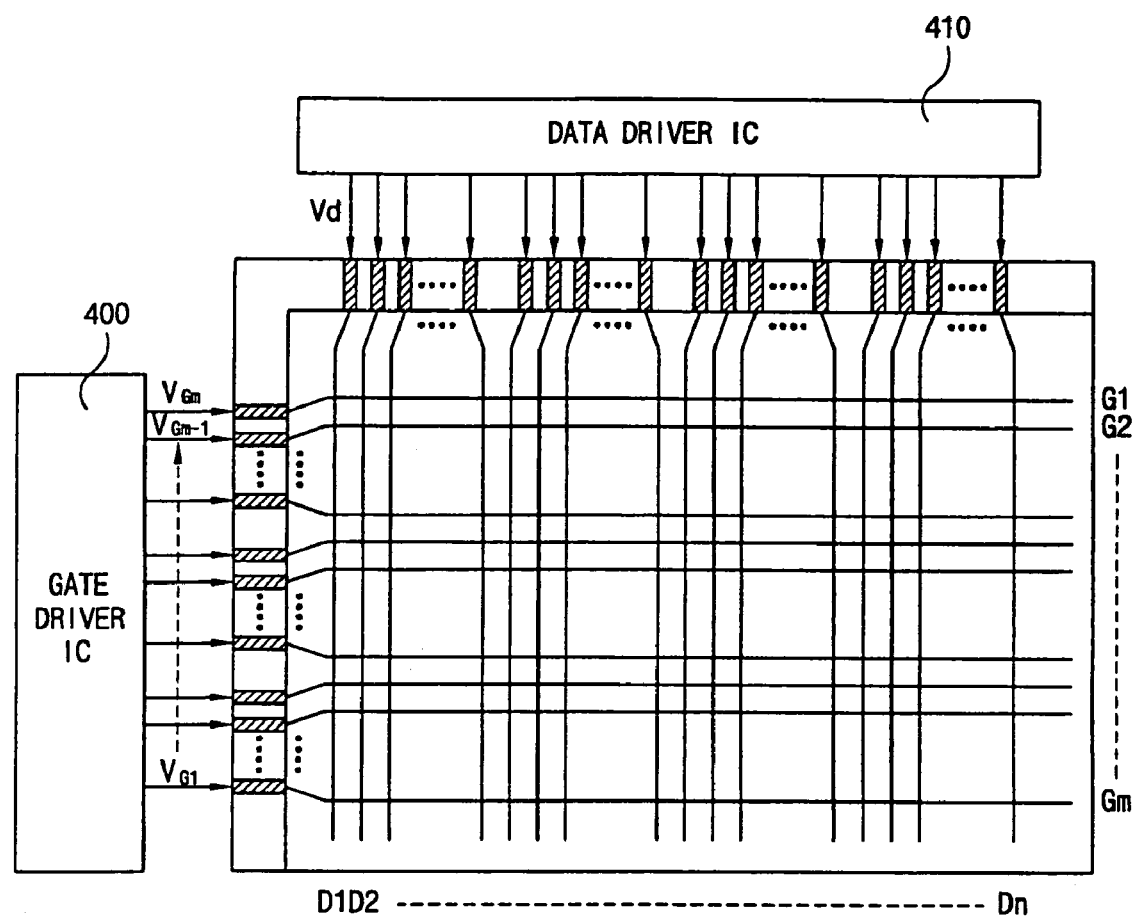
FIG. 9 is an exemplary view showing a method of applying scan signals in accordance with the principles of the present invention.
Figure 10:
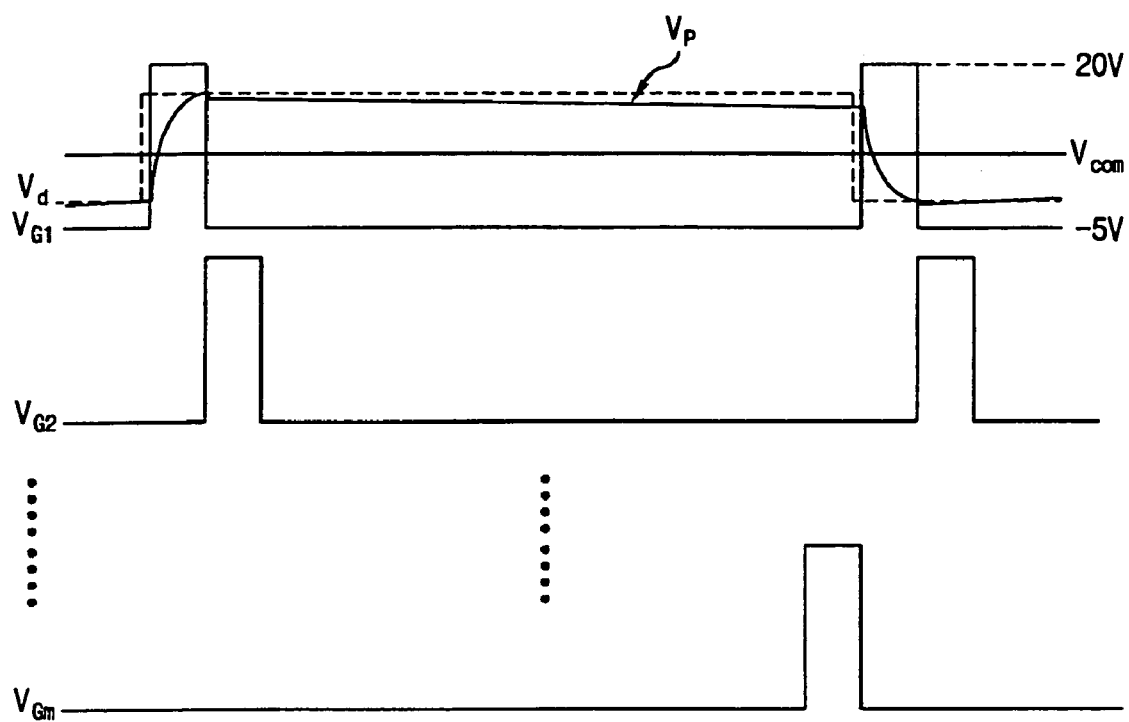
FIG. 10 is an exemplary view showing voltage waveforms of FIG. 9.

Accordingly, to prevent such problems, a better driving method for a liquid crystal display device in accord with FIG. 6 will be described with reference to FIGS. 9 and 10. First, a common electrode voltage ($V_{com}$) is applied to the common electrode. Then, scan signals ($V_{G1}$ to $V_{Gm}$) are sequentially supplied for the m gate lines ($G_1$ through $G_m$) from a gate driver integrated circuit 400. The scan signals ($V_{G1}$ to $V_{Gm}$) are applied as pulses having a low potential of −5V and a high potential of 20V. Accordingly, when a scan signal ($V_{G2}$) is applied to the second gate line ($G_2$), a high potential is applied to the gate electrodes of the thin film transistors associated with the second gate line ($G_2$). Conductive channels are then formed between the source electrodes and the drain electrodes of the associated thin film transistors. Data signal voltages ($V_d$) are then supplied from a data driver integrated circuit 410 to the data lines ($D_1$ to $D_n$). Those data signal voltages ($V_d$) are applied to the source electrodes of the thin film transistors associated with the second gate line ($G_2$). Since those transistors are turned ON, the data signal voltages ($V_d$) are applied to the drain electrodes. Since the drain electrodes are connected to pixel electrodes via drain contact holes, the data signal voltages ($V_d$) are applied to the pixel electrodes that are associated with the second gate line ($G_2$). Thus, an electric field is applied formed with the common electrode, and thus the liquid crystal is driven to control the light transmittance. Since the pixel electrodes are connected to storage electrodes through storage contact holes, the data signal voltages ($V_d$) applied to the pixel electrodes are charged into the storage capacitors associated with the second gate line ($G_2$). When the scan signal (VG2) applied to the second gate line ($G_2$) returns to −5V (LOW) and a scan signal ($V_{G1}$) applied to the first gate line ($G_1$) goes to 20V, the thin film transistors associated with the second gate line ($G_2$) turn off while the thin film transistors associated with the first gate line turn on.

At this time, the data signal voltage ($V_d$) charged into the storage capacitors associated with the second gate line ($G_2$) are continuously supplied to the pixel electrode such that the drive to the liquid crystal cells associated with the second gate line ($G_2$) is maintained.

In addition, as the thin film transistors associated with the first gate line ($G_1$) turn on, the liquid crystal cells, the thin film transistors, and the storage capacitors associated with the first gate line ($G_1$) are driven in the same manner as described above.

As indicated above, in the driving method of a liquid crystal display devices of the present invention, unlike the general driving method, the scan signals ($V_{G1}$ to $V_{Gm}$) are sequentially applied from the mth gate line ($G_m$) up to the first gate line ($G_1$). Thus, the data signal voltages ($V_d$) charged into the storage capacitors have reduced fluctuations. When the liquid crystal display device is driven by the driving method of the present invention, after a scan signal ($V_{G2}$) is applied to the second gate line ($G_2$) a scan signal ($V_{G1}$) is applied to the first gate line ($G_1$). Thus, the data signal voltage ($V_d$) charged into the storage capacitor corresponding to the second gate line ($G_2$) is not affected by the scan signal ($V_{G1}$) applied to the first gate line ($G_1$). Accordingly, the driving method of a liquid crystal display device in accordance with the present invention prevents degradation of a picture quality caused by flicker or an image stain.

As described, the inventive liquid crystal display device and its driving method have the following advantages. Since the conductive channels of the thin film transistors are formed in an inverted "U"-shape, the source electrodes block light incident at an incident angle of less than 30° from reaching the conductive channels of the thin film transistors. Therefore, photo-induced leakage current is reduced or eliminated. This can prevent or reduce picture quality degradation. To drive a liquid crystal display device according to the present invention, the scan signals are sequentially applied from the mth gate line up to the first gate line. Thus, the data signal voltage charged in the storage capacitors are maintained, preventing pixel voltage fluctuations caused by following scan signals. This also prevents picture quality degradation such as flicker or image stains.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of driving a liquid crystal display device comprised of gate lines $G_1$ through $G_M$, comprising:

providing gate lines $G_1$ through $G_M$ arranged at regular intervals on a substrate;

providing data lines arranged at regular intervals so as to cross the gate liens;

providing a thin film transistor in an unit liquid crystal cell defined by the gate lines and the data lines, wherein the thin film transistor includes a gate electrode that extends in a predetermined direction from the gate line, a semiconductor layer over the gate electrode, a source electrode that extends over the semiconductor layer from the date line and a drain electrode, wherein a conductive channel has an inverted "U" shape and wherein light at an incident direction of the inverted "U" shaped conductive channel is blocked by a shielding plate over an upper portion of the thin film transistor;

providing a storage capacitor for the thin film transistor on a pth gate line, wherein the storage capacitor includes a first electrode that is part of a p+1th gate line, a gate insulation film and a storage electrode that is connected to a pixel electrode over the p+1th gate line; and sequentially applying a gate signal voltage pulse to the p+1 gate line, the pth gate line and a p−1 gate line, wherein p+1 is less than or equal to M(M=2, 3 . . . interger), and wherein p−1 is greater than or equal to 1.

2. The method of driving a liquid crystal display device of claim 1, wherein each "U" shaped conductive channel formed by applying a gate signal voltage pulse to the pth gate line charges the storage capacitor disposed over the p+1th gate line.

3. The method of driving a liquid crystal display device of claim 2, wherein the charge of each storage capacitor is not discharged by photo-induced leakage current.

4. The method of driving a liquid crystal display device of claim 2, further comprising providing a translucent reflection electrode at marginal portions of the unit liquid crystal cell and on a passivation film, wherein the reflection electrode formed over the upper portion of the thin film transistor serves as the shielding plate for blocking incident light from reaching the conductive channel.

* * * * *